United States Patent [19]

Peterson

[11] 4,080,854
[45] Mar. 28, 1978

[54] ADJUSTABLE TOOL HOLDER
[75] Inventor: Anders Adolf Peterson, Elmira, N.Y.
[73] Assignee: Hardinge Brothers, Inc., Elmira, N.Y.
[21] Appl. No.: 718,333
[22] Filed: Aug. 27, 1976
[51] Int. Cl.² .......................... B23B 29/00; B26D 1/12
[52] U.S. Cl. ..................................... 82/36 R; 407/79; 407/88
[58] Field of Search ...................... 29/96, 98; 82/36 R, 82/37

[56] References Cited
U.S. PATENT DOCUMENTS

| | | | |
|---|---|---|---|
| 579,965 | 4/1897 | Dowman | 82/37 X |
| 2,330,692 | 9/1943 | DeVlieg | 82/36 R X |
| 2,807,920 | 10/1957 | Householder | 82/36 R X |
| 2,913,935 | 11/1959 | Flannery et al. | 29/96 X |
| 3,277,753 | 10/1966 | Angst | 82/36 R X |
| 3,329,048 | 7/1967 | Ward | 82/36 R |
| 3,433,104 | 3/1969 | Milewski et al. | 29/96 X |
| 3,822,620 | 7/1974 | Willen | 82/36 R |

Primary Examiner—Harrison L. Hinson
Attorney, Agent, or Firm—Shlesinger, Arkwright, Garvey & Dinsmore

[57] ABSTRACT

An adjustable tool holder for use on machine tools such as lathes or the like is disclosed and comprises a base member adapted for mounting on the machine tool and for adjustably mounting a tool holding assembly therein. The features of the base member and the tool holding assembly permit adjustment of a tool bit along X, Y and Z axes with extreme precision.

7 Claims, 12 Drawing Figures

U.S. Patent March 28, 1978 Sheet 1 of 3 4,080,854
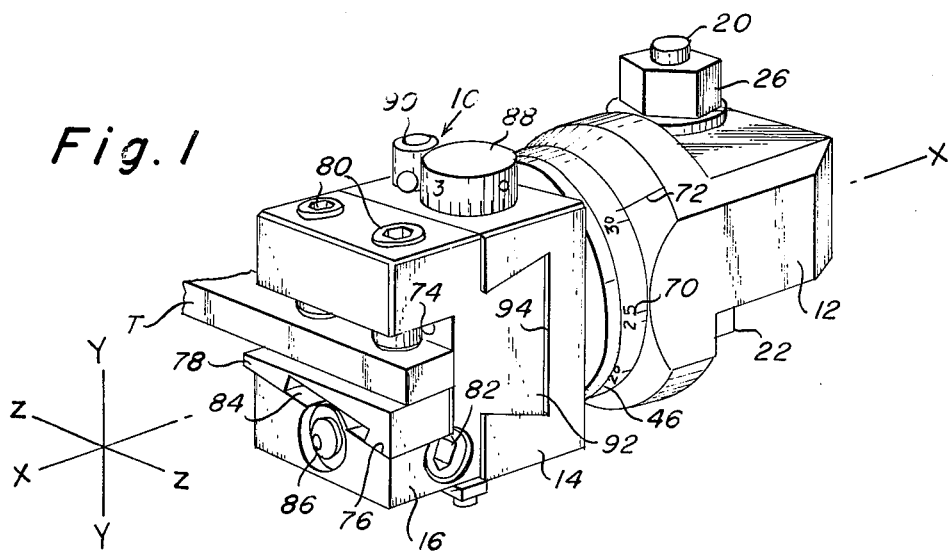
Fig. 1
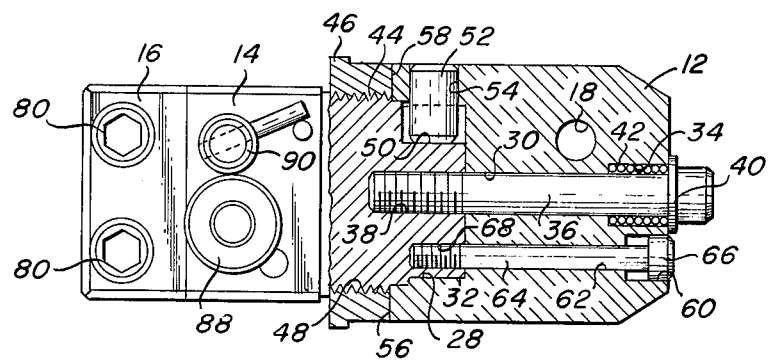
Fig. 2
Fig. 4
Fig. 3
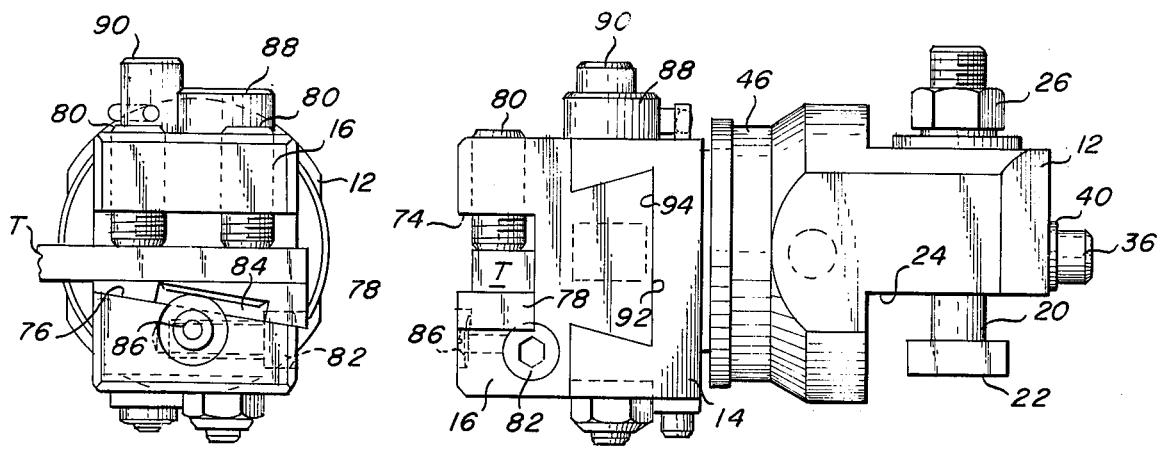

ADJUSTABLE TOOL HOLDER

This invention relates to an adjustable tool holder for machine tools such as lathes, chucking machines, and the like. More particularly, this invention relates to an adjustable tool holder for use on such machines wherein the tool bit may be adjusted with extreme precision along X, Y and Z axes relative to the machine tool spindle.

A variety of tool holders is known to the prior art for use with machine tools. Many of these prior tool holders have been adjustable in some respect and by far the most common adjustment is one for vertically positioning the tool bit on the centerline of the spindle. For such tool holders, adjustment of the tool transversely and longitudinally of the bed of the machine has typically been accomplished by adjustment of the carriage, cross-slide, or turret as is appropriate.

In still other types of tool holders, adjustments have been possible in one horizontal direction either parallel or transverse to the bed of the machine. U.S. Pat. No. 3,641,850, the specification of which is incorporated herein by reference, illustrates such a tool holder having a lateral adjustment capability. In that device, rotation of an adjustment dial effects transverse reciprocation of a tool bit toward and away from the spindle axis.

Very few tool holders have been capable of adjustment of the tool bit in the X, Y and Z directions, but this capability is a distinct advantage, particuarly when precision work is involved.

Modern high-speed machine tools particularly production type tools are capable of producing work with great precision, however, the degree of precision is often a function of the precision in positioning of the tool bit for the machining operation. This is particularly true in the case of programmed machine tools in which a turret is utilized holding several different tool bits, and wherein the longitudinal feed of the turret and the transverse feed of the carriage may vary in cyclic operation.

Accordingly, a primary object of the present invention is to provide an adjustable tool holder which overcomes the disadvantages of prior art tool holders.

Another object of this invention is to provide an adjustable tool holder wherein the position of the tool may be adjusted with great precision.

A further object of this invention is to provide an adjustable tool holder wherein the tool bit may be adjusted longitudinally or transversely of the spindle axis without disturbing the vertical adjustment.

Still a further object of this invention is to provide a tool holder base capable of use with different tool holders.

Yet, a further object of this invention is to provide an adjustable tool holder wherein the tool bit may be adjusted along an X, Y or Z axis independently of, and without disturbing the adjustment of the tool along the other axes.

Still a further object of the invention is to provide a tool holder wherein the adjustment once achieved may be securely locked in position.

These and other objects and advantages of this invention will become apparent when considered in light of the following description and claims when taken together with the accompanying drawings in which:

FIG. 1 is a perspective view of one embodiment of the tool holder of this invention;

FIG. 2 is a top plan view in partial section of the tool holder of FIG. 1;

FIG. 3 is a side elevation of the tool holder of FIG. 1;

FIG. 4 is an end elevation of the tool holder of FIG. 1;

DESCRIPTION OF FIGS. 1-4

Figure 5:
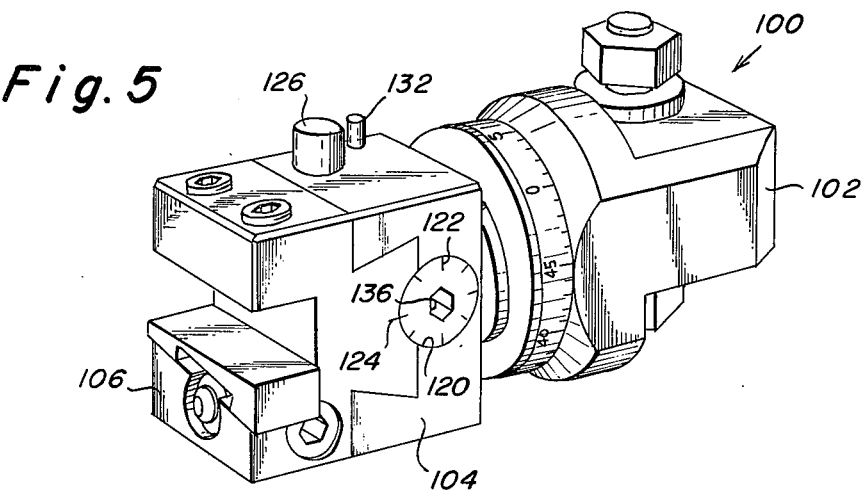
FIG. 5 is a perspective view of an alternate embodiment of a tool holder according to this invention.

The tool holder generally designated 10 of FIGS. 1-4 comprises three basic portions, a base member 12, and a tool-holding assembly including a body member 14 and a tool clamp or slide 16. The base member 12 is provided with a bore 18 through which a T-bolt 20 passes. The bolt 20 is of conventional construction and includes a head 22 which is slideably received in an appropriate mounting slot in the machine tool turret, cross-slide, carriage, etc., as is known in the art. The base member 12 has a precision ground surface 24 which abuts against a mating surface on the turret, cross-slide, carriage etc., and by tightening the nut 26 on the bolt 20, the base member 12 is positively clamped in position on the machine tool.

With reference to FIG. 2, the base member 12 is provided with a cylindrical bore 28 which is coaxial with the cylindrical bore 30. Body member 14 includes a cylindrical projection 32 which is slideably received with bore 28. The opposite end of base member 12 is provided with a counterbore recess 34. A bolt 36 passes through the recess 34 and the bore 30 into a threaded recess 38 in the body member 14, and the bolt is threaded into the recess 38. The bolt 36 is preferably provided with a washer of slightly greater diameter than the counterbore recess 34. A coil spring 42 is positioned around the bolt 36 and bears against the bottom of the recess 34 and the washer 40, and is under compression so as to urge the bolt 36 and the body member 14 to the right as seen in FIG. 2 relative to the base member 12.

The cylindrical projection 32 of body member 14 is externally threaded at 44, and an adjustment ring 46 is internally threaded at 48 so as to mate with threads 44. The projection 32 is also provided with a recess 50, and a pin 52 is pressed into bore 54 and projections into recess 50 in such a manner as to permit relative sliding or reciprocation between body member 14 and base member 12 while preventing relative rotation between body member 14 and base member 12.

Base member 12 is provided with a first contact surface 56 on the end thereof adjacent the body member 14, and adjustment ring 46 is provided with a second contact surface 58. Surfaces 56 and 58 are precision ground to be planar and parallel.

Base member 12 is also provided with a counterbore recess 60 and a bore 62 through which passes a limiting bolt 64 having a head 66 which is slightly larger than bore 62 yet slightly smaller than the counterbore recess 60. Bolt 64 is threaded into a threaded hole 68 in body member 14 for a purpose to be described later.

The operation of the mechanism thus far described will result in a longitudinal adjustment of the tool bit along the X axis of the tool holder, which typically would be parallel to the machine tool spindle. To make the adjustment, the bolt 36 is first loosened slightly, yet the spring 42 continues to urge the bolt 36 to the right as seen in FIG. 2. This maintains surfaces 56 and 58 in continual contact. Then, adjustment ring 46 may be rotated in the desired direction with the result that the body member 14 is moved along the longitudinal X axis, carrying with it the tool holding clamp 16. The extent to which the adjustment may be carried out is limited by the bolt 64 so that when head 66 contacts the bottom of counterbore recess 60, no further adjustment is possible. This prevents accidental disassembly of the tool holder. The adjustment ring is provided with graduated indicia 70, and the base member 12 is provided with a scribed or other suitably affixed zero line 72. By preselecting the pitch of the threads 44 and 48, the extent of travel of the body member 14 relative to the base member 12 for each graduation may be controlled. When the desired position is achieved, the bolt 36 is again tightened, thus locking the longitudinal adjustment.

For the purposes of vertical adjustment the tool clamp 16 is provided with a tool bit receiving recess 74 having a tool bit T positioned therein. The lower portion of the recess is provided with an inclined surface 76 upon which is mounted an adjusting wedge 78. The tool bit T rests on the upper surface of the adjusting wedge 78, and is locked in this position by means of set screws 80. The vertical position of the tool bit T may however be adjusted by varying the transverse position of the adjusting wedge 78. To this end, an adjusting screw 82 is adapted so as to engage the adjusting wedge 78 whereby rotation of the adjusting screw 82 will result in movement of the adjusting wedge 78 horizontally as seen in FIG. 4. The adjusting wedge 78 is preferably provided with a recess 84 which may be engaged by the head of a retaining screw 86 to prevent the adjusting wedge from being displaced from recess 74.

Such construction is similar to known adjustments, as is the operation thereof. After the adjusting screw 82 is turned to the desired extent to properly position the tool T along the vertical Y axis, the set screws 80 are tightened to lock the tool T in position.

To effect transverse adjustment of the tool bit T along a Z axis, an adjustment mechanism of the type referred to in U.S. Pat. No. 3,641,850 may be utilized. The mechanism by which the adjustment is accomplished is clearly described in U.S. Pat. No. 3,641,850, and is accomplished by means of a calibrated knob 88 which moves the tool clamp 16 horizontally as viewed in FIG. 4, the adjustment thereafter being locked by means of knob 90. The adjustment occurs by relative movement between the tool clamp 16 and the body member 14. The tool clamp 16 is seen to have a dove-tail projection 92 which fits in a correspondingly shaped dove-tail recess 94 in body member 14.

It will be noted that longitudinal adjustment of the tool T along the X axis by means of the adjustment ring 46 will not affect the transverse or vertical adjustment of the tool along the Y or Z axes. The same is true with respect to adjustment of the tool along the transverse Z axis since such adjustment will not affect either the vertical or longitudinal adjustment of the tool bit T. This arrangement, then, permits extremely accurate adjustment and positioning of the tool bit relative to the workpiece being machined, such being particuarly advantageous in the case of high-speed production machines.

DESCRIPTION OF FIGS. 5–8

In the embodiment of FIGS. 5–8, the longitudinal X axis adjustment and the vertical Y axis adjustment are the same as in the embodiment of FIGS. 1–4. Thus, the tool holder 100 includes a base member 102, a body member 104 and a tool slide 106. Members 102 and 106 are the same as members 12 and 16, except to the extent that tool clamp 106 has been modified for use with body member 104 as will become apparent.

Figure 7:
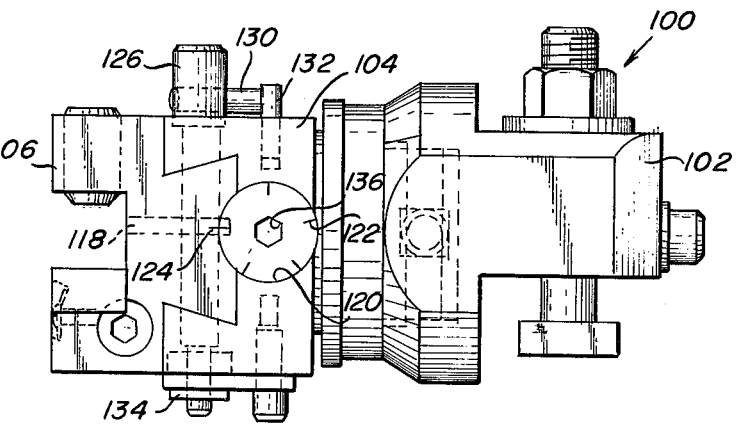
FIG. 7 is a side elevation of the tool holder of FIG. 5.
Figure 9:
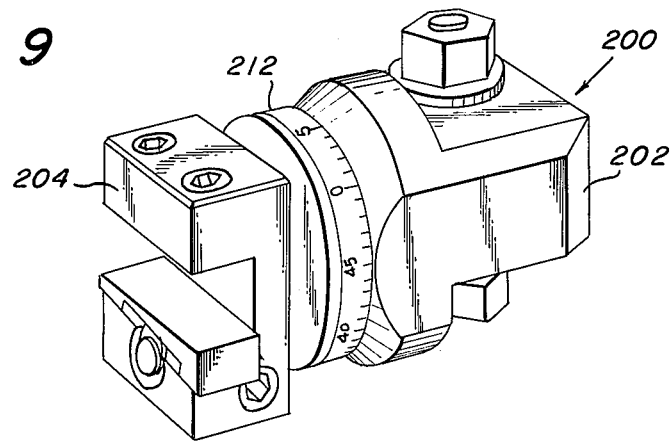
FIG. 9 is a perspective view of an alternate embodiment of a tool holder according to this invention.
Figure 10:
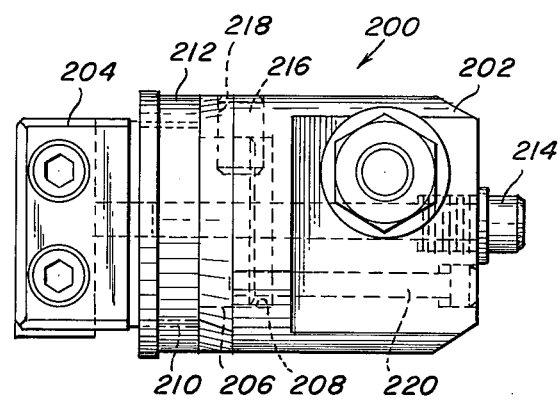
FIG. 10 is a top plan view of the tool holder of FIG. 9.
Figure 12:
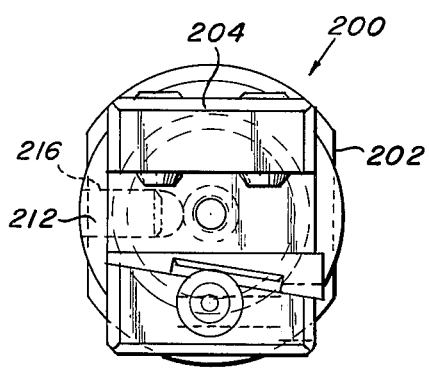
FIG. 12 is an end elevation of the tool holder of FIG. 9.
Figure 11:
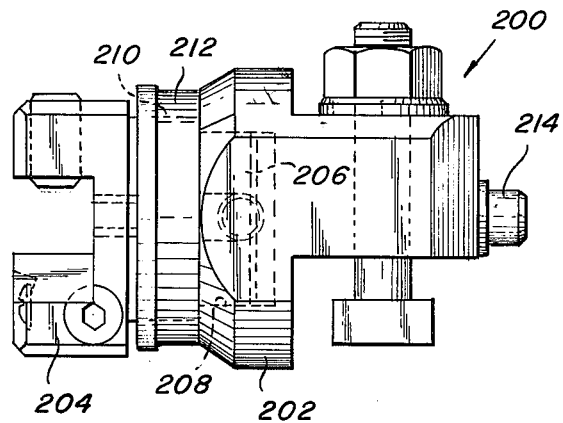
FIG. 11 is a side elevation of the tool holder of FIG. 9.

The body member 104 is provided with a threaded hole 108 into which a bolt 110 is threaded. Bolt 110 is provided with a head having two portions 112 of enlarged diameter and a portion 114 of smaller diameter therebetween so as to form an annular groove 116 in the head of the bolt 110. The tool clamp 106 is provided with a pin 118 which is pressed into tool clamp 106 and extends into the annular groove 116. The tool slide 106 is also provided with an arcuate cut-out 120 to provide clearance for the head of the bolt 110. As seen in FIG. 7, the head of the bolt 110 is preferably provided with graduations 122 which are readable with zero line 124 on the tool slide 106. It has been found advantageous to mark the graduations 122 in 0.001 inch increments.

A locking bolt 126 is seen to pass through the body member 104 and the dove-tail portion of tool slide 106. The dove-tail portion is provided with an elongated slot 128 to provide clearance for the locking bolt 126. The bolt 126 is also provided with an extension arm 130 of such a length as to contact stop pin 132 to limit rotation of the locking bolt 126. Bolt 126 threadedly engages a nut 134 which is constrained against rotation by any suitable means. Thus, rotation of bolt 126 in a clockwise direction as viewed in FIG. 6 results in a drawing together of the arms of the dove-tail slot, providing a clamping action on the dove-tail projection of tool slide 106.

Figure 6:
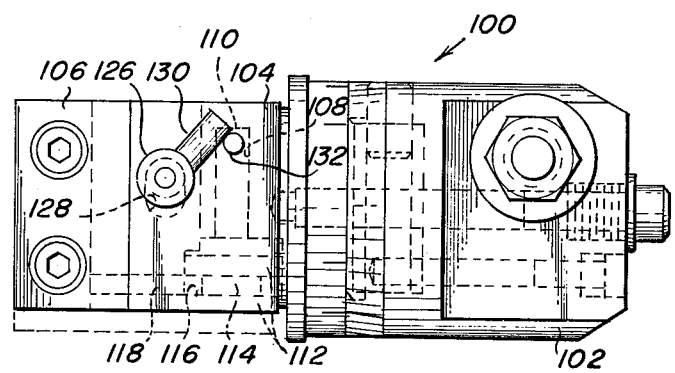
FIG. 6 is a top plan view of the tool holder of FIG. 5.
Figure 8:
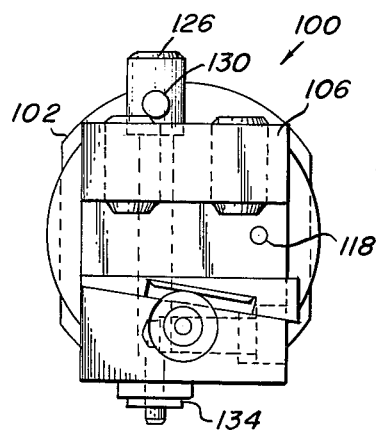
FIG. 8 is an end elevation of the tool holder of FIG. 5.

To make an adjustment of the tool slide, and thus the tool, in a lateral direction along the Z axis, the locking bolt 126 is rotated in a counterclockwise direction as viewed in FIG. 6, and a suitable Allen wrench (not shown) is inserted into hexagonal recess 136 in the head of the bolt 110. By turning the bolt 110, for example in a counterclockwise direction as viewed in FIG. 7, the bolt is unscrewed from the bore 108, carrying with it pin 118 and tool slide 106 into which the pin is pressed. Thus, the tool slide 106 and the bolt 110 move to the dotted line position of FIG. 6. When the desired position is reached, the locking bolt 126 is rotated in a clockwise direction as viewed in FIG. 6 until the extension are 130 contacts stop pin 132. At this point, the position of the tool clamp 106 will be locked, thus locking the lateral position of the tool along the transverse Z axis.

DESCRIPTION OF FIGS. 9–12

The embodiment illustrated in FIGS. 9–12 is one wherein adjustment of the tool is carried out along the longitudinal X axis and the vertical Y axis, no transverse adjustment along the Z axis being permitted with this construction. The tool holder 200 is seen to include a base member 202 which is the same as base members 12 and 102. The tool slide 204 is similar to tool slide 16 and 106, but is modified to coact with the base member 202 as will be described. Instead of being provided with a dove-tail projection as is the case with tool slides 16 and 106, the tool clamp 204 is provided with a cylindrical projection 206 extending into cylindrical bore 208 in base member 202. Cylindrical projection 206 is externally threaded at 210 which threads are engaged by an internally threaded ring member 212. A clamping bolt 214 threadedly engages a central bore in cylindrical projection 206 in a manner identical to bolt 36. Additionally, a pin 216 is pressed into base member 202 and engages a recess 218 in cylindrical projection 206 so as to prevent relative rotation of the tool clamp 204 and the base member 202. A limiting bolt 220 is the same as bolt 64, and limits travel of the tool clamp 204 along the longitudinal X axis.

Operation of this device for adjustment along the X axis is identical with the operation of the device shown in FIGS. 1 through 4 as is vertical adjustment of the tool along the vertical Y axis. Thus, reference is had to the description of the operation found earlier with respect to FIGS. 1-4 for a more complete description thereof.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of appended claims.

What is claimed is:

1. A tool holder for use on a machine tool whereby a tool held thereby may be adjusted along mutually perpendicular axes, said tool holder comprising:
   a base member having a longitudinal X axis,
   a first contact surface at one end of said base member substantially normal to said X axis, and a recess formed in said one end of said base member,
   a tool holding assembly including a portion telescopically received in said recess along said X axis, said assembly including an adjustment ring threadedly engaging said portion and having a second contact surface on a radial face thereof in engagement with said first contact surface whereby rotation of said adjustment ring adjusts the relative position of said assembly and said base member along said X axis,
   spring tension means for maintaining said first and second contact surfaces in substantially continual contact during adjustment of said base member and said assembly,
   means limiting the relative travel between said assembly and said base member and thereby preventing disassembly of said base member and said assembly,
   means for preventing relative rotation of said base member and said assembly,
   means for locking said base member and said assembly against relative movement along said X axis and comprising a bolt member passing through said base member coaxial with said X axis and threadedly engaging said body member so that rotation of said bolt member varies the contact pressure between said first and second surfaces between a locked position wherein said adjustment ring is substantially immovable and an unlocked position wherein said adjustment ring is rotatable for adjusting the relative position of said base member and said assembly against said spring tension means while said first and second contact surfaces remain in substantially continuous contact,
   said assembly further including a tool receiving slot and means for clamping a tool in said slot, and
   means for adjusting the position of a tool in said slot along a Y axis perpendicular to said X axis.

2. An adjustable tool holder as in claim 1 and wherein:
   said recess and said portion are cylindrical and coaxial with said ring member along said X axis.

3. An adjustable tool holder as in claim 1 and wherein:
   said first and second contact surfaces are planar and parallel.

4. An adjustable tool holder as in claim 1 and wherein:
   a. said base member includes a counterbored recess at the end opposite said one end and concentric with said X axis, and
   b. said spring member comprises a coil spring positioned around said bolt member and in said counterbored recess.

5. An adjustable tool holder as in claim 4 and wherein:
   said assembly includes means for horizontally adjusting a tool held thereby along a transverse Z axis perpendicular to said X and Y axes.

6. An adjustable tool holder as in claim 4 and wherein:
   a. said tool holding assembly includes a dove-tail slot, and
   b. a tool holder having a dove-tail projection positioned within said dove-tail slot, said tool receiving slot being formed in said tool holder.

7. An adjustable tool holder as in claim 6 and including:
   a. means for adjusting the position of said tool holder in said dovetail slot along said Z axis, and
   b. means for locking said tool holder in position in said dove-tail slot.

* * * * *